Figure 1:
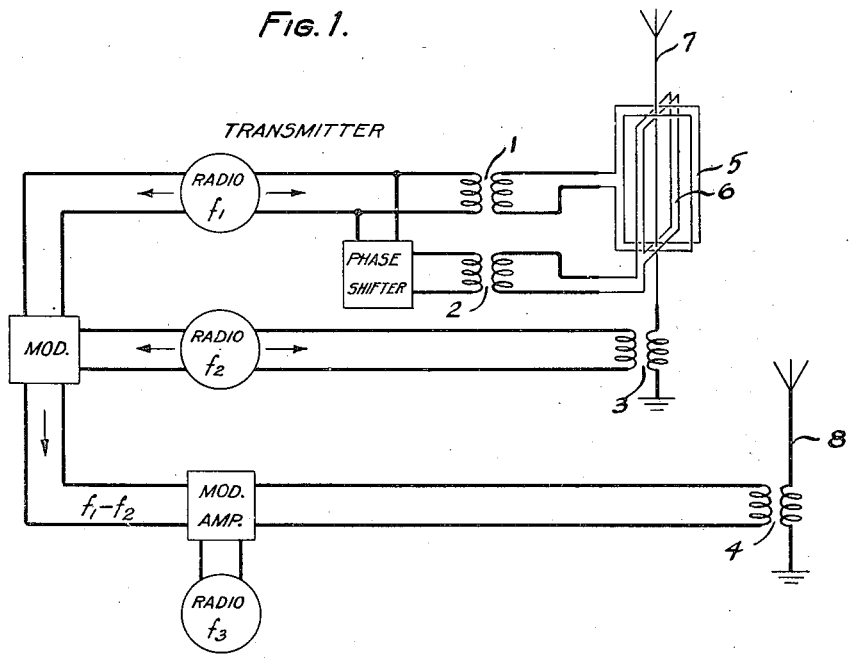

Patented Oct. 31, 1933

1,933,248

UNITED STATES PATENT OFFICE 1,933,248

RADIO DIRECTION FINDING

Porter H. Evans, Brooklyn, N. Y., and John W. Greig, Clifton, N. J., assignors to Bell Telephone Laboratories, Incorporated, New York, N. Y., a corporation of New York Application May 14, 1929. Serial No. 362,900

12 Claims. (Cl. 250—11)

This invention relates to methods of, or systems for radio direction finding. It perhaps has its greatest utility in defining the course of a mobile station, for example, an airplane, and for guiding such station along the course defined.

In the art of radio direction finding, it has been common to employ communicating means between a mobile station and one or more fixed stations, involving the use of either a transmitter or a receiver at the mobile station to determine by triangulation the instantaneous position of the mobile station with respect to these fixed stations and therefore to enable a course to be set. While such means may insure the ultimate progress of a mobile station to its objective, it does not insure that such progress shall be in a direct line. Therefore, while in most instances such means are reasonably effective for the navigation of ships at sea where relative movements may easily be measured, they are not so effective in air navigation, which is attended by relatively large side drift due to atmospheric currents which cannot easily be measured or corrected for.

It has accordingly resulted that for air navigation especially, it has become practically necessary to use a directive method or system in which paths may be fixed definitely with relation to the earth, thus eliminating dependence on momentary direction determination. These paths constitute reference lines or patterns which define courses for the mobile station. A simple method of radio guidance of this kind, in use at present, involves fixed transmitting apparatus and the course is a radio line extending from the transmitter. A requirement in a radio method or system for defining a course and for guiding an object along it, whether of the above, or of other type within the same broad classification, naturally involves a means whereby a positive indication is obtained when the mobile station is in its course and showing, by a change in its indication, in sense and amount, any deviation from the course. The receiving circuit in the mobile station should also be adjustable so that any desired course relative to those determined by the reference pattern may be set on the indicator.

In the method or system above described, the discrimination between "ether" areas comprised between the lines of the pattern and those areas which are contiguous to the lines, is based on the relative amplitude characteristics of the waves received in these respective areas, that is, on the directive charcateristics of the transmitting station. Applicants conceived the idea of a somewhat similar method but using phase, instead of amplitude, discrimination, and certain inherent advantages in the same.

It is the principal object of the invention to provide means for fixing a desired course more effectively than by prior methods or means and for following such course with less deviation.

In its simplest form the method involves the use at the mobile receiving station of a phase standard wave having the same frequency as that of the beacon wave. This wave is adjustable both as to phase and amplitude so that, with respect to the indicator in the output circuit of the receiver, in which such local wave and beacon wave are combined, a "zero input" line may be determined. Any deviation from this line would immediately be indicated by a resultant output from a receiver. Since a progressive change of instantaneous phase, with respect to points in an arc of a circle circumscribed about the beacon station, (which condition defines the requisite phase variation) implies or attends a rotating field set up by the beacon station, or at least a field which continuously traverses the general area in which the receiver is to move, the principle of the invention is in a sense distinctly different from that of the previous methods in the same general class, an example of which has been described, and which are principally characterized by the employment of a fixed radio pattern localized over the earth's surface. Since the present invention is not dependent on any such fixed pattern, there is no limitation as to the course which may be set toward the objective, while preserving the benefits of the null indication principle, this being a distinct advantage over prior systems. The operation of the method of the invention is also characterized by an inherently more sensitive response to deviations of the mobile receiving station from the set course than the operation of methods depending upon amplitude discrimination. This means that the mobile receiving station is able to follow its set course with less deviation.

Other objects of the invention are therefore to provide methods and means whereby a mobile receiving station may more unerringly set and follow a desired course, and with less sacrifice of accuracy and of sensitivity depending on the choice of courses, than may be achieved by prior methods and means.

In a preferred form of the invention, in order to avoid difficulties in synchronizing the beacon wave and the phase standard wave, the phase variations in the beacon wave may be translated into, and made use of in, a reproduced modulating component of it, the same modulations being impressed on an independently radiated wave at the beacon station and when reproduced at the mobile receiving station, used as the phase standard wave. Observations may be facilitated by giving the modulating wave an audible frequency, so that, for example, a telephone receiver can be used as the indicating instrument.

In the drawing, Fig. 1 shows a transmitting station at a fixed point, and

Figure 2:
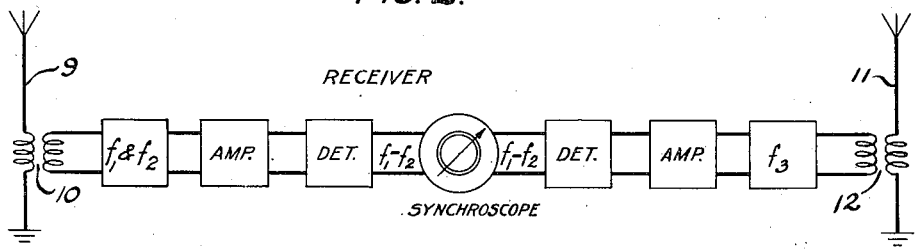

Fig. 2 shows a receiving station which may be located on an airship or other mobile object.

In Fig. 1 a wave of radio frequency $f_1$ is generated in an oscillation generator indicated by the symbol, Radio $f_1$ and is fed into a loop transmitter 5 through a transformer 1. Connected to the output of this generator in parallel with said transformer is a phase shifting device indicated by the words "Phase shifter", through which a part of the wave of frequency $f_1$ is passed, and which shifts the phase of such part 90°. This wave is then fed to a second loop transmitter 6 through a transformer 2, the second loop being crossed with respect to the first. There is thus broadcast a rotating field at the frequency $f_1$, which may be considered a beacon wave.

If there is now provided at the mobile receiving station means for receiving this wave, and means for producing a standard reference wave of the same frequency and constant relative phase, it will be possible to guide the mobile station in a direct line to the transmitting station by maintainnig this phase relationship constant. That is, if the beacon wave received were compared with the standard wave at some particular point on the arc of a circle whose radius was equal to the distance of the mobile station from the transmitting station, the two waves would be in phase. At another point on this circle 90° away from the first, the beacon wave would be, say, 90° ahead of the standard reference wave in phase. At a third point 90° further along in the same direction the two waves would be directly out of phase. At a fourth point 90° further along in the same direction the beacon wave would be 270° ahead of the standard wave. At whatever point the mobile receiving station might be located the phase relationship of the two waves would be constant along a line connecting that point to the transmitting station, so that the mobile station might be set and kept on a course direct to the transmitting station by traveling in a direction which would keep the phase relationship between the two waves constant.

However a difficulty with this system for airplane beacons, with the apparatus at present available, is that it is difficult to build an oscillation generator which will operate with sufficient stability on an airplane to permit the wave generated thereby to be used as a standard reference wave. But if a field is provided which can be stepped down to a low frequency rotation, a reference standard wave of this frequency may be broadcast to the receiver on a carrier wave and a constant phase relationship established.

To accomplish this, a second wave of radio frequency $f_2$ is generated in a second oscillation generator indicated by the symbol Radio $f_2$ and this is fed into a vertical antenna 7, located within a small fraction of a wave length of the loop centers through a transformer 3. A receiver and detector on which these two waves of frequencies $f_1$ and $f_2$ are impressed will then produce in the detector output a beat frequency $f_1-f_2$ and the phase of this beat frequency will be a direct function of the phase relationship between the radio frequencies $f_1$ and $f_2$. In other words there will be effectively set up a field rotating at the frequency $f_1-f_2$, which may be considered a beacon wave of this frequency.

It will therefore be necessary to provide at the mobile receiving station a reference wave of this frequency for phase comparison. This may be done, as illustrated in Fig. 1, by transmitting a wave of this frequency from the transmitting station on a third carrier wave, which may be separately received and detected, and used for phase comparison with the beacon wave. This method avoids any errors which might be caused by a failure of the two comparison waves to keep in step.

A third radio frequency generator indicated by the symbol, Radio $f_3$ generates a wave of radio frequency $f_3$ which is fed into a modulating device indicated by the symbol Mod. amp. Waves generated by the two radio frequency generators $f_1$ and $f_2$ are intermodulated in a modulating device indicated by the symbol Mod. and the resultant wave of frequency $f_1-f_2$ is fed into the modulating and amplifying device just mentioned, where it modulates the radio frequency $f_3$. The resultant wave is broadcast from a vertical antenna 8, to which it is fed through a transformer 4. This antenna need not be centrally located, since a moderate displacement of the long modulating wave of frequency $f_1-f_2$ will make no material difference in its phase relationship with the beacon wave of this frequency at any point.

At the receiver located at the mobile station illustrated in Fig. 2 the waves of frequency $f_1$ and $f_2$ are selectively received on an antenna 9 to the exclusion of waves of frequency $f_3$ and are impressed through a transformer 10 on an amplifying device indicated by the symbol, Amp. After amplification they are impressed on a detector indicated by Det. B, in which they are detected and the resultant wave of frequency $f_1-f_2$ impressed on a synchroscope, or other phase indicating device.

A second antenna 11 located at the receiver selectively receives the modulated wave of frequency $f_3$ which is impressed through a transformer 12 on an amplifier Amp. in which it is amplified. It is then detected in the device indicated by Det. R and the resultant wave of frequency $f_1-f_2$ is impressed on the phase indicating device, indicated in the drawing as a synchroscope. In order to increase the flexibility of the method so as, for example, to make a readjustment of the course, a phase shifting and amplitude varying means may be provided in the output of one of the detectors in order to make possible a null indication.

It is to be understood of course that this invention is not limited to the specific means shown. For instance, each loop antenna might be replaced by two suitably spaced vertical antennæ.

What is claimed is:

1. A direction finding system comprising in combination a fixed, beacon, transmitting station, and a mobile receiving station, said beacon transmitting station comprising means for transmitting waves whose instantaneous phase varies uniformly along the arc of a circle centering in the beacon station, and said receiving station comprising phase discriminating means for determining the direction of the beacon station and for indicating a deviation of position from a course corresponding to such direction.

2. A radio direction finding system comprising a broadcasting station, means for broadcasting a wave the phase of which varies with direction from said broadcasting station at points equi-distant therefrom, means for broadcasting a second wave the phase of which is the same at all points equi-distant therefrom, a receiving station, and means at said receiving station for receiving and comparing the phase characteristics of said broadcast waves.

3. A radio direction finding system comprising a broadcasting station, a mobile receiving station, means for broadcasting a rotating directional wave component and a non-directional wave component, the phase relation of which varies in accordance with the direction of the first mentioned component, separate means for receiving said waves, and phase indicating means connected thereto for comparing the received waves, whereby a change in direction of the point of reception from the said broadcasting station will be indicated by a change in the phase relationship of the received waves.

4. In a radio direction finding system, means for producing waves from which a rotating field wave may be derived, means for transmitting a reference wave of the derived frequency as a modulating component of a carrier wave, a receiving station, and means at said receiving station for receiving and comparing said waves.

5. In a radio direction finding system, a broadcasting station, means at said broadcasting station for broadcasting a plurality of waves of different frequencies, and a standard comparison wave of a difference frequency, a receiving station, means for separately receiving and detecting said different frequency waves and said standard comparison wave, and means for comparing the phase relationship of said waves at said receiving station.

6. In a radio beacon system, a transmitting station and a receiving station, means at said transmitting station to produce a wave having a directional phase characteristic and a standard comparison wave, and means at said receiving station to receive and interpret said waves.

7. The method of direction finding by radio which comprises broadcasting waves from which a wave in the audio frequency range having a directional phase characteristic may be derived, broadcasting a reference wave of the derived frequency as a modulating component of a second carrier wave, receiving said waves over separate antennæ at a receiving station, and comparing the phase relationship of said waves to determine the direction of the broadcasting station.

8. The method of direction finding by radio which comprises broadcasting a wave having a directional phase characteristic, receiving said wave at a mobile receiving station, and comparing the characteristics of said wave with a standard comparison wave at said mobile receiving station.

9. Means for producing a rotating field of audio frequency, comprising a pair of crossed loop transmitters, means for transmitting from one of said loops a wave of radio frequency, means for transmitting from the other of said loops a wave of the same frequency displaced 90 degrees in phase, a vertical antenna centrally located with respect to said crossed loops, and means for transmitting from said vertical antenna a wave of such frequency that the difference between the two frequencies will be within the audio range.

10. Means for producing a field rotating at audio frequency, comprising a pair of crossed loop antennæ, means for broadcasting radio frequency waves of different phase therefrom, a vertical antenna located centrally with respect thereto, and means for broadcasting a wave of radio frequency from said antennæ.

11. Means for producing a field rotating at audio frequency comprising a plurality of associated antennæ transmitting waves of a plurality of frequencies, two of said antennæ transmitting waves of the same frequency but of different phase, and another of said antenna transmitting waves of a different frequency.

12. A radio beacon system, including a transmitting system comprising means for transmitting a directional beam rotating at radio frequency associated with means for transmitting a non-directional wave of another radio frequency to produce the effect of a beam rotating at the beat frequency, means for producing a wave of a third radio frequency, means for intermodulating said first and second radio frequency waves to produce a wave of different frequency, means for modulating said third radio frequency wave with said wave of difference frequency, means for transmitting said modulated wave of third radio frequency, and a receiving system comprising means to compare the phase of the beat between the waves of said first and second radio frequencies with the modulations on said wave of third radio frequency.

PORTER H. EVANS.
JOHN W. GREIG.